United States Patent [19]

Fujii et al.

[11] 4,293,418

[45] Oct. 6, 1981

[54] FLUID SEPARATION APPARATUS

[75] Inventors: Yoshishige Fujii, Ohtsu; Syozo Nagao, Shiga; Shunji Kumazawa, Ashiya, all of Japan

[73] Assignee: Toray Industries, Inc., Tokyo, Japan

[21] Appl. No.: 24,512

[22] Filed: Mar. 28, 1979

[51] Int. Cl.$^3$ .................. B01D 31/00; B01D 53/22
[52] U.S. Cl. ................ 210/321.1; 210/433.2; 55/158
[58] Field of Search .......... 210/323 T, 321 A, 321 B, 210/321 R, 433 M; 55/158

[56] References Cited

U.S. PATENT DOCUMENTS

| | | | |
|---|---|---|---|
| 3,228,877 | 1/1966 | Mahon | 210/321 B |
| 3,339,341 | 9/1967 | Maxwell et al. | 55/158 |
| 3,768,660 | 10/1973 | Block | 210/321 R |
| 3,832,830 | 9/1974 | Serow | 55/158 |
| 3,963,622 | 6/1976 | Baudet et al. | 210/321 R |
| 4,031,012 | 6/1977 | Gics | 210/321 A |
| 4,066,553 | 1/1978 | Bardonnet et al. | 210/321 R |
| 4,140,637 | 2/1979 | Walter | 210/321 R |

FOREIGN PATENT DOCUMENTS 47-27186  10/1972  Japan ..................... 210/321 R

OTHER PUBLICATIONS

AF Encyclopedia of Textiles, Second Edition, Prentice-Hall Inc., Englewood Cliffs, N.J. 1972, pp. 300–305.

American Heritage Dictionary, Houghton Mifflin Co., Boston, Mass., W. Morris, Editor, 1975, pp. 487 and 1482.

"Optimal Design of Hollow Fiber Modules", Doshi et al., Aiche Journal, 9/1977, vol. 23, No. 5, pp. 765–768.

*Primary Examiner*—Charles N. Hart
*Assistant Examiner*—David R. Sadowski
*Attorney, Agent, or Firm*—Armstrong, Nikaido, Marmelstein & Kubovcik

[57] ABSTRACT

A fluid separation apparatus comprising a bundle or bundles of a great number of permselective hollow fibers inserted into a casing and having both the ends fixed by tube sheets is disclosed. This bundle is composed of a great number of hollow fiber elements, each of which consists of one or two hollow fibers wound around by a spacer yarn composed of a textured yarn. This fluid separation apparatus is advantageously used as an artificial kidney.

18 Claims, 4 Drawing Figures the hollow fibers elements, respectively and so the hollow fiber element bundle is contained in the casing in the state pressing the inside of the wall of the casing by virtue of the bulkiness and elasticity of the texturned yarn constituting the spacer yarn.

In the fluid separation apparatus having the above-mentioned structure, when tube sheets are formed by potting, a curable liquid potting material is easily intruded into spaces formed between a great number of fine hollow fibers communicated with each other spaces through passages formed by specific spacer yarns and therefore, tube sheets having a completely liquid-tight sealing effect can be molded at high efficiency, and the fluid flowing externally of the hollow fibers having permselectivity is distributed uniformly into spaces defined by the spacer yarns while flowing along the surfaces of the respective hollow fibers, whereby formation of a stagnant zone is effectively prevented. Moreover, the boundary layer resistance is remarkably reduced by the turbulent flow effect caused by such specific spacer yarns, and the separation effect can be improved unexpectedly and prominently.

Still further, in making the fluid separation apparatus having the above-mentioned structure, by virtue of the bulkiness of the textured yarn, the bundle of hollow fiber elements is allowed to exert positively an elasticity in a normal direction of the axis of the bundle thereof, and therefore, the diameter of the bundle can easily be reduced by a pressing force externally applied. The bundle of reduced diameter can easily be inserted in the casing in the diameter-diminished state. Accordingly, the hollow fibers are not substantially be damaged when inserted into the casing. Since the hollow fiber bundle is contained in the cylindrical casing in the state pressing the inside of the wall thereof by the elastic recovery force of the bundle, no clearance is formed between the bundle and the cylindrical casing causing a channeling flow of the fluid flowing externally of the hollow fibers. Thus, there can be attained a very significant advantage that can effectively prevent the reduction of the separation efficiency.

DETAILED DESCRIPTION OF THE PREFERRED EMBODIMENTS

Figure 1:
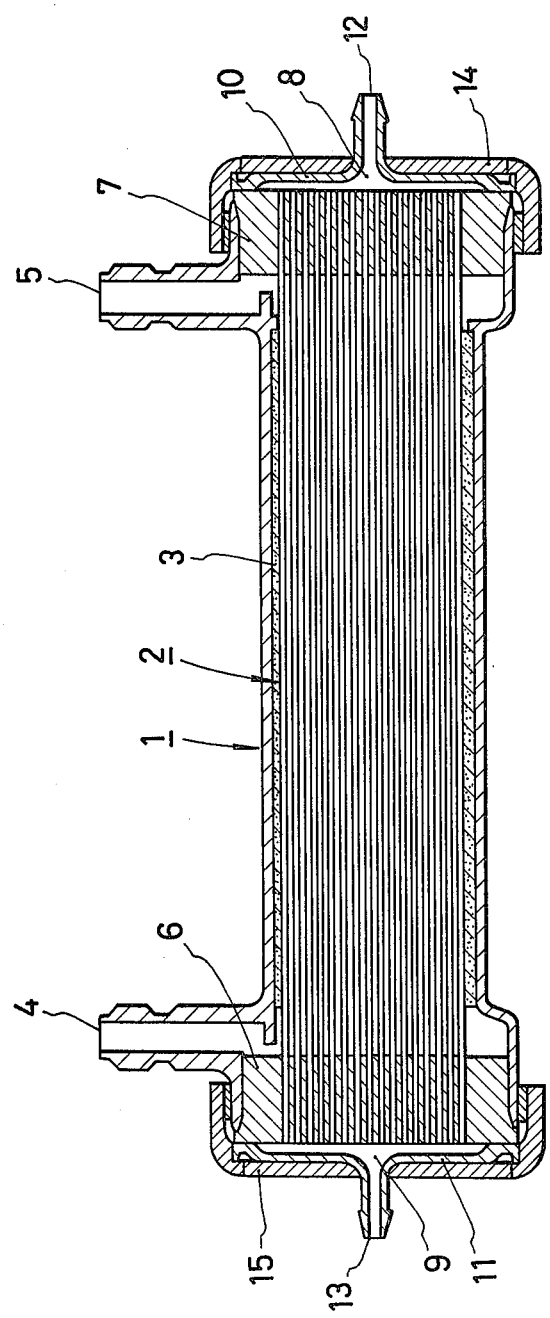
FIG. 1 is a longitudinally sectional view illustrating the entire structure of one embodiment of the fluid separation apparatus of the present invention.

Referring to FIG. 1 illustrating the entire structure of the fluid separation apparatus of the present invention, a cylindrical casing 1 constituting the vessel of the separation apparatus has fluid inlet 5 and outlet 4 on the side portion thereof. When this apparatus is used for reverse osmosis or ultrafiltration, a high pressure can be applied through the fluid inlet 5 by means of a pump. The shape of the casing 1 is not particularly critical, but in view of the pressure resistance and from the viewpoint of formation of uniform flows, it is preferred that the vessel or casing 1 be molded to have a cylindrical shape. The material constituting the casing 1 should have a sufficient pressure resistance and be sufficiently anti-corrosive to fluids to be treated. If desired, a supporting member 3 composed of an elastic material such as a plastic foam may be disposed to support a bundle 2 of hollow fiber filaments. In the embodiment shown in the drawing, the supporting member 3 is disposed in the central portion of the casing 1.

The hollow fiber element bundle 2 is supported and fixed onto the casing 1 at tube sheets 6 and 7 formed on both the ends of the bundle 2. These tube sheet portions 6 and 7 are kept liquid-tight, and open ends of hollow fibers are communicated with chambers 8 and 9 formed externally of the casing 1. The headers 10 and 11 have fluid inlet 12 and outlet 13, respectively. It is preferred that caps 14 and 15 be attached to both the ends of the apparatus.

A thermosetting polymer composition is preferably employed in a pot processing as a material constituting the tube sheets 6 and 7. A preferred material is appropriately selected after due consideration of such properties as pressure resistance, corrosion resistance, solvent resistance and toxicity according to the intended use of the apparatus.

Furthermore, a preferred material is appropriately chosen for the headers 10 and 11 forming the chambers 8 and 9 located externally of the casing 1 together with the tube sheets 7 and 6 after due consideration of such properties as pressure resistance, corrosion resistance, solvent resistance and toxicity, as in case of the casing 1 and the tube sheets 6 and 7.

For example, when the apparatus is used for a special treatment such as hemodialysis, polymethyl methacrylate, polystyrene, polycarbonate, ABS resin or AB resin is preferably used as the material of the casing, and polyethylene, polypropylene, polycarbonate or polymethyl methacrylate is preferably used as the material of the headers. As the material of the tube sheets, there are preferably employed silicone resins and polyurethanes derived from an isocyanate-terminated prepolymer and a polyol component composed mainly of castor oil or modified caster oil. However, when the apparatus is used for ordinary separation treatments such as reverse osmosis, ultrafiltration, dialysis and pressure separation of mixed gases, the materials for the casing and headers can be selected from ordinary polymeric materials and metallic materials, and a thermosetting polymer composition customarily used in the art can be used as the material for the tube sheets. Furthermore, a material for the caps is appropriately chosen from the foregoing materials.

The most characteristic feature of the present invention resides in the structures of hollow fiber elements and a bundle 2 thereof which is contained in the casing 1. Accordingly, the structures of the hollow fiber elements and hollow fiber element bundle 2 that are used in the present invention will now be described in detail.

Figure 2:
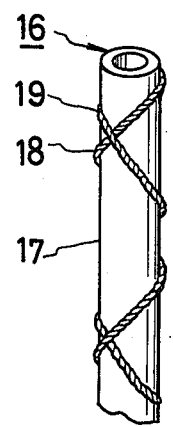
FIGS. 2, 3 and 4 are perspective views illustrating diagramatically instances of the hollow fiber element that is used in the present invention, which consists of one or two hollow fibers around which a spacer yarn composed of a textured yarn is spirally wound.
Figure 3:
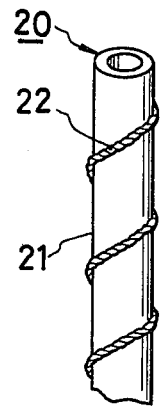
Figure 4:
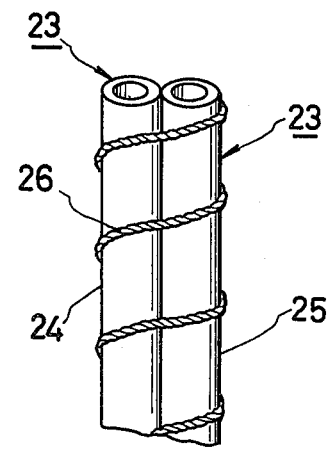

Instances of hollow fiber elements that are used in the present invention are diagrammatically illustrated in FIGS. 2 to 4. A bundle of hollow fiber elements is formed by gathering a great number of hollow fiber elements. In the instance shown in FIG. 2, a hollow fiber element 16 consists of one hollow fiber 17 and two spacer yarns 18 and 19 composed of textured yarns, which are spirally wound around the hollow fiber 17 in directions S and Z, respectively. In the instance shown in FIG. 3, a hollow fiber element 20 consists of one hollow fiber 21 and one spacer yarn 22 wound around the hollow fiber 21 in the direction Z. In the instance shown in FIG. 4, a hollow fiber element 23 consists of two hollow fibers 24 and 25 to form a pair and one

FLUID SEPARATION APPARATUS

BACKGROUND OF THE INVENTION (1) Field of the Invention

The present invention relates to a fluid separation apparatus constructed by using permselective hollow fibers.

(2) Description of the Prior Art

Methods for separating substances by utilizing the permselective characteristics of a semipermeable membrane, such as reverse osmosis, ultrafiltration, osmosis, dialysis and pressure separation of gas mixtures, are known. A fluid separation apparatus comprising semipermeable membranes in the form of hollow fibers having an outer diameter of several hundred microns or less, is very advantageous as the fluid separation apparatus utilizing a permoselective membrane, because the weight of the semipermeable membrane or equivalent pressure externally applied is supported by hollow fibers per se having a tubular structure and owing to a very fine size of the hollow fibers, it is able to enlarge the effective surface area of the semipermeable membrane to be packed in the unit volume.

In order to prepare such a separation apparatus having a large permeation area by utilizing the abovementioned advantage, it is necessary to make a bundle of a very great number of hollow fibers and to fix each hollow fiber at the both ends, respectively, in a cylindrical casing by the tube sheets into which the every ends of the hollow fibers are potted without any opening and every bore of hollow fibers are are opened to the outsides of tube sheets of both bundle ends, so that the fluid circulating in the interior of the hollow fibers of thus assembled apparatus should never be mingled with the externally circulating fluid and every hollow fiber membrane will be effectively utilized. Processes for the preparation of such apparatus are disclosed in the specifications of U.S. Pat. Nos. 3,228,876 and 3,228,877.

Furthermore, the specification of U.S. Pat. No. 3,339,341 proposes a process comprising assembling a fibrous bundle composed of a great number of hollow fibers into a centrifugal apparatus and forming tube sheets on both the ends of the hollow fiber bundle potted by a curable liquid material under application of a centrifugal force. However, it is required a very high technique to make tube sheets by potting both the ends of bundle by such material without clogging and leakage, which bundle ranges in fiber quantity from several thousand hollow fibers to scores of millions of hollow fibers and which fibers are replasticized by glycerin or the like to prevent degradation of the semipermeable characteristics. Accordingly, it is practically very difficult to attain a high manufacturing efficiency by such potting processes.

Moreover, in a separation apparatus comprising a bundle of a very great number of fine hollow fibers, distribution of the circulating fluid in the external portions of the fibers in the interior of the apparatus frequently becomes non-uniform to form stagnant zones, and the separation efficiency of the apparatus is reduced considerably, or the flashing effect is locally insufficient when the apparatus is washed. And it results in serious defects in practical operation. For example, in case of hemo-dialysis, harmful substances such as a sterilizing agents are left in the apparatus, or in case of reverse osmosis or ultrafiltration, the performances of the apparatus may reduce every time when reversely flashing to regenerate.

Many attempts have heretofore been made to prevent formation of stagnant zones causing reduction of the separation efficiency and the capacity of the apparatus. For example, there has been proposed an apparatus in which ribbon-like members are wound around bundles of hollow fibers to prevent formation of stagnant zones between the bundles. However, the separation capacity of an apparatus of this type is insufficient and the apparatus is hardly put into practical use. Furthermore, the specification of U.S. Pat. No. 4,066,553 proposes an apparatus in which thread-like elements are wound around relatively thick tubular membranes composed of a porous support so that a certain space is maintained between such tubular membranes and the adjacent portion (wall) of the apparatus. However, this proposal is very difficult to apply to fine hollow fibers, which are soft and weak such an arrangement, and the improvement of the performances are hardly expected since the thread-like elements wound around tubular membranes are ordinary straight yarns.

Under such background, we conducted research with a view to developing a fluid separation apparatus capable of performing the fluid separation at a high efficiency and of being assembled very easily at a low cost, and as a result, we have now completed the present invention.

SUMMARY OF THE INVENTION

It is a primary object of the present invention to provide a fluid separation apparatus comprising permselective hollow fibers, which can perform fluid separation at a high efficiency, especially to provide a fluid separation apparatus of improved moldability of the tube sheets, at which a bundle of a great number of fine hollow fibers are fixed and attached to a casing, able to be potted without clogging and leakage and of a remarkably improved flowing conditions of fluid outside the hollow fibers without stagnant zones.

Another object of the present invention is to provide an excellent fluid separation apparatus which can be assembled very easily at higher yield.

Other objects, features and advantages of the present invention will be apparent from the description given hereinafter.

In accordance with a fundamental aspect of the present invention, the foregoing objects can be attained by a fluid separation apparatus comprising a bundle of a great number of hollow fiber elements contained in a casing, each hollow fiber element comprising one or two permselective hollow fibers around which a spacer yarn composed of a textured yarn is spirally wound.

More specifically, in accordance with the present invention, there is provided a fluid separation apparatus which comprises a bundle of permselective hollow fibers, tube sheets formed on both the ends of the bundle and a casing containing therein the bundle of hollow fibers, wherein both the ends of each hollow fiber are opened to chambers formed externally of both the ends of the casing, respectively, at said tube sheet portions; the casing includes an inlet port and an outlet port on the side portions sealed by said tube sheets, and the bundle of hollow fibers comprises a great number of hollow fiber elements, each of which consists of one or two hollow fibers around which a spacer yarn composed of a textured yarn is spirally wound so that substantially equal and constant spaces are formed between spacer yarn 26 wound around this pair of the hollow fibers 24 and 25 in the direction S.

In a bundle formed by gathering a great number of such hollow fiber elements, spaces among respective hollow fibers are kept substantially equal and constant by the presence of the spacer yarns wound around the hollow fibers in the above-mentioned specific manner. Accordingly, one or two spacer yarns may be wound around one or two hollow fibers in one direction in one layer or a plurality of layers, or two or more spacer yarns may be wound around one or two hollow fibers in opposite directions in two or more layers. When two or more spacer yarns are wound in one direction, a plurality of layers of the spacer yarns may be formed by changing the winding angle (gradient) in the spacer yarns. An appropriate winding manner is chosen according to the kind and properties of the spacer yarn and the intended use of the apparatus.

Such hollow fiber element formed by winding the spacer yarn around the hollow fiber is wound on a reel or the like by known means as shown in FIG. 10 of U.S. Pat. No. 3,339,341, and it is cut into a necessary length and used for formation of a hollow fiber element bundle.

As is apparent from the structure and objects of the present invention, the material, shape and characteristics of the permselective hollow fibers that are used in the present invention are not particularly critical. For example, as the material constituting the permselective hollow fibers, there can be used cellulose esters such as cellulose diacetate and cellulose triacetate, cellulose derivatives such as cellulose ether, polyamide, polyester, methacrylic or acrylic polymers such as polymethyl methacrylate, polyurethanes, organic silicon polymer, polyacrylonitrile and copolymer thereof, polysulfones, and polyolefins such as polyethylene and polypropylene. The intended effects of the present invention can be advantageously attained when permselective hollow fibers of these polymeric materials which are relatively non-swelling under application conditions are employed.

Hydrophobic polymeric substances such as methacrylic or acrylic polymers represented by polymethyl methacrylate and polyacrylonitrile are especially effectively used as the material of the hollow fibers to be used in the apparatus of the present invention, because such material has a high separation activity. However, hollow fibers composed of such hydrophobic polymeric substance are relatively rigid and take a straight linear form with a high nerve and a reduced flexibility. Accordingly, when hollow fibers composed of such material are employed, spaces are formed between the inside of the wall of the casing and the bundle of hollow fiber elements, and channeling flow is readily generated. If a spacer yarn is used for formation of hollow fiber elements in the above-mentioned manner according to the present invention, such defect of hollow fibers of hydrophobic polymeric substances can be effectively eliminated.

The shape characteristics of the hollow fibers are now described. In general, it is preferred that the outer diameter of the hollow fibers ranges from 50 to 600 microns, especially from 200 to 400 microns, and that the wall thickness of the hollow fibers be from 5 to 100 microns, especially from 20 to 60 microns. When the hollow fibers are too thick in diameter, the surface area is reduced and the separation performance of the unit becomes low. On the other hand, when the thickness of the hollow fibers is too small, the separation operation becomes difficult because a higher pressure is required, and a stagnant zone is readily formed.

In order to attain the intended effects of the present invention advantageously, it is preferred that the number of hollow fibers constituting the bundle of hollow fiber elements be at least 2000, especially at least 6000. As the number of the hollow fibers is increased, the surface area is increased but there are readily caused such disadvantages as insufficient sealing during the molding of tube sheets, damages of the hollow fibers during the step of inserting the bundle into the casing, generation of a stagnant zone among the hollow fibers and generation of channeling flow. However, if the spacer yarn is used according to the present invention, these disadvantages can be conveniently eliminated.

The spacer yarn should exert not only the function of a spacer, that is, the function of keeping the spaces among the hollow fibers constituting the hollow fiber element bundle substantially equal and constant, but also the function of causing turbulent flows in the fluid flowing externally of the hollow fibers and the function of imparting an elasticity to the hollow fiber element bundle. In order to impart desirable characteristics to the apparatus of the present invention and not to damage hollow fibers in the manifacture of the apparatus, yarns having appropriate properties and being composed of appropriate materials may be chosen and used as the spacer yarn suitably depending on the properties of the hollow fibers to be used and the intended use of the apparatus. Generally speaking, textured yarns composed of continuous filaments of polyesters, polyacrylonitriles or polyamides are preferably employed as the spacer yarn, and a textured yarn composed of polyester multifilaments is especially preferred. Moreover, textures yarns composed of cellulose fibers such as cellulose acetate and rayon fibers, polyvinyl alcohol fibers, polyvinyl chloride fibers or polyvinylidene fluoride fibers may be used according to the objects and intended use of the apparatus.

More specifically, a textured yarn of polyvinylidene fluoride fibers is preferably employed for separation of fluids having a high corrosive action or having high dissolving and swelling properties, and a textured yarn of polyester or cellulose acetate fibers having only a very small amount of water extractable materials is preferably employed for hemodialysis.

A textured yarn having a relatively high bulkiness and a relatively high elasticity is preferred because hollow fiber elements can be formed without damaging hollow fibers in the wet state which have been plasticized by glycerin or the like and the packing ratio or packing state of hollow fibers in the apparatus can easily be adjusted by virtue of the elasticity or bulkiness of the spacer yarn.

For example, when hollow fibers are packed in the casing so that the packing ratio, which will be described hereinafter, is 30 to 78%, a spacer yarn is selected and used appropriately according to the thickness and packing ratio of the hollow fibers so that the bundle of the hollow fiber elements can be inserted into the casing in the compressed and diameter-reduced state and after insertion, the bundle can press the inner wall of the casing by virtue of the elasticity and bulkiness of the spacer yarn.

As the textured yarn that can be used as the spacer yarn, there can be mentioned, for example, stretch yarns, modified stretch yarns and bulk yarns. Modified stretch yarns and bulk yarns having an appropriate elongation are preferably employed as the spacer yarn in the present invention.

The stretch yarns include conventional twist-set-untwisted textured yarns, false-twisted textured yarns and edge-crimp textured yarns, and any of these stretch yarns can be used in the present invention. When such stretch yarns are employed, in order to prevent excessive swelling of the hollow fiber element bundle, it is preferred that the bundle be temporarily bound in at least one portion by an appropriate rope or band.

The modified stretch yarns include modified false-twisted textured yarns and modified stretch yarns formed by heat-setting such false-twisted textured yarns in the wound state of a package. These modified stretch yarns are preferably used in the present invention.

The bulk yarns include stuffer box textured yarns, air-jet textured yarns, knit-denit textured yarns and gear crimp textured yarns. Such bulk yarns are preferably employed in the present invention.

Above mentioned conventional textured yarns are used in the present invention. These known textured yarns are described in detail in AF ENCYCLOPEDIA of TEXTILES (second edition) by the Editors of American Fabrics Magazine, pages 299 to 307, Manual of Man-Made Fibers written by Charles Z. Carroll-Porczynski and published by Astex Publishing Company, pages 161 to 171 and Textured Yarn Technology, Volume 1 published by Monsanto Textiles Division, pages 1 to 200.

From the viewpoint of the above-mentioned functions of the spacer yarn, the diameter of the bundle of the hollow fiber elements on which the spacer yarn is wound is selected so that the diameter of the bundle is slightly larger than the diameter of the casing into which the bundle is to be inserted.

More specifically, the diameter of the hollow fiber element bundle is ordinarily selected so that the area of the section of the bundle is 1.04 to 1.44 times the area of the section of the casing, though this range differs to some extent depending on the bulkiness and elasticity of the spacer yarn and the quantity of the wound spacer yarn.

The diameter of the hollow fiber element bundle is determined by wrapping a thin and smooth film having a width of 5 mm around the periphery of the bundle so that the wrapped film is applied a weight of 10 g to each end of the film and the length of the circle of the film is measured.

In order to attain the above-mentioned features conveniently, it is preferred that the denier of the textured yarn to be used as the spacer yarn be small and its apparent diameter be large, and that the elongation in the direction of the fiber axis be small.

In the present invention, it is preferred that the textured yarn denier be 50 to 300 D, especially 75 to 150 D, and that the denier of monofilament which compose the textured yarn be 1 to 15 d, especially 2 to 10 d. Furthermore, it is preferred that the apparent diameter of the textured yarn be about 0.5 to about 3 times the outer diameter of the hollow fiber. The elongation of the textured yarn is not particularly critical, but an elongation possessed by ordinary modified stretch yarns or bulky yarn is sufficient.

The apparent thickness (diameter) of the textured yarn is determined by projecting a textured yarn on which a tension of 1 g is imposed, in the state enlarged at about 10 magnifications, measuring the distance between two filaments located at outermost points at 10 random positions along the yarn axis while using a table of random numbers and calculating the mean value.

The hollow fibers are maintained in the state pressed to one another under an appropriate pressure in the casing by virtue of the elasticity and bulkiness of the spacer yarn which is wound around the hollow fibers. The mutual pressing force among the hollow fibers makes it possible to prevent occurrence of an undesirable phenomenon where the spaces between every two adjacent hollow fibers are extraordinarily expanded by the action of the fluid flowing externally of the hollow fibers, resulting in generation of non-uniform flow.

Moreover, since the bundle of the hollow fiber elements has an elasticity, it presses uniformly against the inner wall of the casing, and therefore, occurrence of channeling flows in the fluid flowing between the inside of the casing and the surface of the bundle can be effectively prevented.

In the fluid separation apparatus of the present invention, the separation efficiency can be improved by preventing occurrence of channeling flows of fluids by utilizing the pressing force of the inserted bundle to the inner wall of the casing as described above. It is, however, difficult to measure this pressing force directly. Accordingly, in the present invention, the force necessary for pulling out the bundle from the casing in which the bundle is inserted is adopted as a relative value indicating the pressing force. More specifically, the bundle inserted in the casing is held vertically, both the ends of the bundle protruding from the casing are separately bound by an adhesive tape, one of the bound portions is set on a hook of a spring balance, the casing is gradually pulled down, the scale of the spring balance is read when the bundle is just about to move in the casing and the read value is designated as the pull-out force. When the bundle is tightly pressing to the inside of the wall of the casing, the pull-out force is large, and when the bundle is weakly pressing to the inner wall of the casing, the pull-out force is small.

The pull-out force of the bundle varies depending on the surface condition of the bundle, the contact length between the bundle and the casing, the material of the casing and the frictional force between the bundle and the inside of the wall of the casing, and therefore, it is difficult to specify a preferred value of the pull-out force. However, for example, in the case where the separation apparatus is used as an artificial kidney, it is preferred that this pull-out force be in the range of 0.2 to 3.0 kg. When the pull-out force is small and lower than 0.2 Kg, the bundle is arranged in a degree which is not generating a sufficient pressing force to the inside of the wall of the casing, and channeling flows are readily caused in the fluid flowing externally of the hollow fibers. When the pull-out force is larger than 3.0 Kg, the pressing force is sufficient and channeling flows are not caused in the external flow, but the bores of the hollow fibers are drastically deformed by such strong pressing force, and in an extreme case, the bores of the hollow fibers are crushed flat and the fluid to be passed internally of the hollow fibers is hardly allowed to pass through the interiors of the hollow fibers.

The fluid separation apparatus of the present invention has various advantages also in connection with the assembling process. A first advantage is that by virtue of the elasticity of the hollow fiber element bundle, damages (collapses, scratches and breakages) of the hollow fibers can be prevented at the step of inserting the bundle into the casing. According to this advantage, formation of loss products can be remarkably reduced, and the separation capacity of the apparatus can be improved and the life thereof can be prolonged. A second advantage is that damages of the hollow fibers also at the covering step of winding the textured yarn around the hollow fibers can be prevented. More specifically, by virtue of an appropriate elasticity of the textured yarn and an appropriate stretchability thereof in some case, the hollow fibers are prevented from being pressed or twisted at the covering step. A third advantage is that occurrence of insufficient sealing can be prevented at the potting step of forming tube sheets on both the ends of the bundle by using a thermosetting resin. More specifically, by virtue of the bulkiness of the textured yarn and random entanglements among monofilaments of the textured yarn, the resin is allowed to intrude easily into spaces among the hollow fibers and spaces among monofilaments constituting the textured yarn.

In the present invention, the number of windings of the spacer yarn around the hollow fiber is often important. More specifically, if the winding density of the spacer yarn helically wound around the hollow fibers is high, the effect of regulating the space between every two adjacent hollow fibers is increased, but the effective surface area of the hollow fibers is decreased. In the present invention, if the thickness and bulkiness of the spacer yarn are appropriately chosen, even when the winding number is relatively small, the intended effect of improving the fluid separation efficiency by keeping the spaces among the hollow fibers substantially equal and constant can be sufficiently attained. The range of the preferred winding number varies depending on the intended characteristics of the separation apparatus, for example, the resistance of the fluid flowing externally of the hollow fibers, the thickness and bulkiness of the spacer yarns and the packing ratio of the hollow fibers in the casing of the separation apparatus. However, it is ordinarily preferred that the winding number of the spacer yarn be 0.05 to 20, especially 0.2 to 4.0, per 10 mm of the hollow fiber. One of the intended effects of the present invention, that is, the effect of improving the separation efficiency by uniformalizing the distribution of the fluid flowing externally of the hollow fibers to control the formation of stagnant zones, can be sufficiently attained if the winding number of the spacer yarn is at least 0.05 per 10 mm of the hollow fiber. However, when the winding number exceeds 20 per 10 mm of the hollow fiber, reduction of the separation efficiency by decrease of the effective surface area of the hollow fibers is so prominent that the above-mentioned effect of improving the separation efficiency by prevention of formation of stagnent zones is substantially set off by this reduction of the effective surface area, and therefore, one of the intended effects of the present invention cannot be sufficiently attained. Another important effect of the present invention is that when tube sheets are formed on both the ends of the hollow fiber element bundle by potting a curable liquid polymer composition, completely air-tight tube sheets can be molded without leaving any spaces in the tube sheet portions of the bundle. For attaining this effect, it is indispensable to prevent three or more hollow fibers from contacting closely to one another in the potted layer. This can be attained more advantageously as the winding number of the spacer yarn is larger, and from this viewpoint, it is preferred that the winding number of the spacer yarn be at least about 0.2 per 10 mm of the hollow fiber. Of course, if the potted layer is thin, the winding number may be increased, and if the potted layer is thick, the winding number may be decreased. Furthermore, the lower limit of the winding number is changed depending on whether or not the spacer yarn is a multi-filament yarn or whether the bulkiness of the spacer yarn is high or not. Therefore, in the present invention, it is difficult to specify the lower limit of the winding number of the spacer yarn. Still further, in the present invention, when the winding number of the spacer yarn exceeds 4, the intended effects are enhanced only slightly even if hollow fibers having appropriate thickness and elasticity and a spacer yarn having appropriate size and configuration are chosen. Accordingly, from the economical viewpoint, it is preferred that the winding number of the spacer yarn be about 4 per 10 mm of the hollow fiber.

The above-mentioned spacer yarn is helically wound around one or two hollow fibers to form a hollow fiber element, and a bundle is formed by gathering a great number of such hollow fiber elements.

In the said bundle of the present invention the hollow fiber elements are arranged to keep each distance between adjacent hollow fiber elements substantially equal and constant, and three or more hollow fibers may never contact closely with each other along a substantial length in the direction of the fiber axis. Accordingly, when the fiber ends of the said bundle is potted by a curable liquid polymer composition to form the tube sheets, it is possible to prevent from forming of an undesirable bore, which are left as an unpotted space surrounded by three or more hollow fibers closely to each other, and which causes leakage of the fluid from the tube sheet. Various methods for formation of tube sheets have heretofore been proposed. The method disclosed in the specification of U.S. Pat. No. 3,339,341 is very ingeneous and industrially advantageous, where the open end portions of the hollow fibers are sealed under application of a centrifugal force by a liquid which has a higher specific gravity and being incompatible with the curable liquid material, and then in succession the curable liquid material is injected and cured under application of a centrifugal force. However, leakage of the fluid from the tube sheets potted by such a process is often found in the actual operation. Even if such leakage is occured only in one portion of bundle fibers comprising several thousand hollow fibers or up to scores of millions of hollow fibers, the apparatus cannot be practically used as an effective separation apparatus. Therefore, development of a method capable of preventing such leakage with ease has been eagerly desired in the art. As a result of examinations of such leakages, we found that when 3 or 4 hollow fibers adhere closely to one another in the direction of the fiber axis along a certain length, the curable liquid material is hardly allowed to intrude into the space surrounded by such hollow fibers and therefore, there are left in the tube sheet small holes from which the fluid leaks. Occurrence of this undesirable phenomenon can be effectively prevented with ease according to the present invention.

As pointed out above, the effect of improving the separation efficiency can be attained as well as the above-mentioned effect of prevention of leakages of the fluid from the tube sheets in the present invention. For example, when the fluid separation apparatus of the present invention is used for dialysis, the dialysis efficiency is determined by the overall masstransfer resistance Ro corresponding to the sum of the boundary layer resistance Rb of the liquid flowing internally of the hollow fibers, the inherent resistance Rm of the permselective membrane and the boundary layer resistance Rd of the dialyzate solution. The resistance Rb is determined by the inner diameter of the hollow fibers, the flow rate and the diffusion rate of the solute, and although the resistance Rm is a value inherent of the membrane, the resistance Rd varies remarkably depending on the structure of the apparatus, especially the degree of distribution of the dialyzate solution or the presence of stagnant zones. Accordingly, the efficiency of the apparatus as a whole is remarkably influenced by this resistance Rd. The degree of the presence of stagnant zones is determined by spaces between the hollow fiber element bundle and the casing, spaces in the hollow fiber element bundle and each distance between adjacent hollow fiber elements respectively. In most of conventional dialyzers which have been practically used, a regenerated cellulose material is used for hollow fibers, and although researches have been made hollow fibers of a synthetic polymer or a semi-synthetic polymer such as a modified cellulose, they have not been put into practical use on an industrial scale. Such a reason may be considered so that since the water swelling property of regenerated cellulose hollow fibers is very high, even if the above-mentioned spaces between the bundle and the casing and spaces in the hollow fiber element bundle are larger, the hollow fibers are swollen and elongated while the apparatus is used and they are frizzled in the casing, so that the spaces are uniformly distributed together with the hollow fibers in the entire interior of the cylindrical casing. Then the formation of stagnant zones is naturally prevented, and the increase of the resistance Rd by the presence of stagnant zones is controlled and a relatively high dialysis efficiency can be attained. In contrast, in case of hollow fibers composed of a hydrophobic synthetic polymer or semi-synthetic polymer having a low water swelling property, attainment of the effect of controlling formation of stagnant zones by swelling and elongation of the hollow fibers can be expected to be less, and even if a bundle of such hollow fibers is excellent as the permeable membrane in the performance and physical properties, it is difficult to manufacture an apparatus having a sufficiently high dialysis efficiency on an industrial scale by using such hollow fibers of a hydrophobic synthetic or semi-synthetic polymer.

The dialysis resistance of such non-swelling hollow fibers can be improved relatively easily by reducing spaces between the hollow fiber bundle and the inside of the wall of the casing to a possible lowest level. However, it is very difficult to prevent formation of stagnant zones by spaces among the hollow fibers, which is a most serious factor causing reduction of the dialysis efficiency, according to an industrially applicable technique. More specifically, even if formation of stagnant zones is effectively controlled and the dialysis efficiency is sufficiently high in the initial stage, the hollow fiber bundle may be divided into small portions by flows of the dialyzate solution while the apparatus is used, and spaces are formed and stagnant zones are generated, resulting in conspicuous reduction of the dialysis efficiency. Occurrence of this undesirable phenomenon is confirmed by abrupt increase of the above-mentioned resistance Rd, and this undesirable phenomenon often takes place more or less even in an apparatus including also water-swelling regenerated cellulose hollow fibers. It is also desired for a dialyzer that the flow resistance of the dialyzate solution, that is, the pressure drop between the inlet and outlet for the dialyzate flow, should be as small as possible. However, in a dialysis apparatus including a bundle of non-swelling hollow fibers, in order to reduce the boundary layer resistance Rd of the dialyzate solution sufficiently, it is necessary to increase the packing ratio of hollow fibers to a level approximating to 100%. In such closely packed state, the pressure drop is drastically accumulated on the dialyzate solution side, and this is a fatal defect when the apparatus is applied to hemodialysis.

When the packing ratio $\epsilon$ of hollow fibers is defined as $\epsilon = N \times s/S$ where S represents the area of the cross section of the inside of casing of the separation apparatus, s represents the area of the circular section of the outer periphery of the hollow fibers and N represents the number of the hollow fibers. If the hollow fibers are packed in the closest state of the arrangement of a hexagon in a casing of circular cylinder, the packing ratio $\epsilon$ is about 90.5%, and if the hollow fibers are packed in the closest state in the square arrangement in a casing of circular cylinder, the packing ratio $\epsilon$ is 78.5%. In the hemodialyzer of regenerated cellulose type hollow fibers, the packing ratio $\epsilon$ of the hollow fibers is ordinarily about 45 to about 50% and the pressure drop of the dialyzate solution side is about 10–15 mmHg when the dialysate flow rate is 500 ml/min., and the boundary layer resistance Rd of the dialyzate solution is about 5–10 minutes per cm when the average flow rate of the dialyzate solution is about 60 cm/min. In contrast, in case of non-swelling hollow fibers, if the packing ratio is lower than about 78%, spaces are formed in the hollow fiber bundle and the pressure drop of the dialyzate solution side is as great as 35 mmHg or more, and furthermore, the boundary layer resistance Rd of the dialyzate solution becomes about 10–15 minutes per cm or higher. As a result, if the packing ratio $\epsilon$ is decreased so as to moderate the pressure drop on the dialyzate solution side, the boundary layer resistance Rd of the dialyzate solution is increased very abruptly, and the dialysis efficiency is drastically lowered.

According to the present invention, while the packing ratio of hollow fibers is maintained between 30 to 78%, preferably 40 to 70%, it can be stably attained that the flow resistance may be lower than 10 mmHg and the boundary layer resistance Rd lower than 15 min/cm, even in case of non-swelling hydrophobic hollow fibers which is not swelled and elongated because of the mutual action of the hollow fiber-constituting material and the fluid. Simultaneously, the undesirable reduction of the efficiency during the dialysis operation can be prevented completely.

Moreover, if such a structure that a bundle of hollow fiber elements is supported and entirely bound by means of a flexible supporting member 3 composed of closed cells as shown in the entire diagram of FIG. 1 is applied, hollow fibers can be equidistantly arranged in the bundle and a suitable packing ratio can be controlled very easily, and therefore, the quality and characteristics of the product can be uniformalized very stably. For attaining this advantage, to use a textured yarn having an appropriate bulkiness is very effective.

The foregoing effects and advantages of the present invention are attained not only when the apparatus of the present invention is applied to dialysis but also in other fluid separation methods, and common problems involved in fluid separation methods can be effectively solved according to the present invention. More specifically, in case of reverse osmosis or the like, if the flow condition of the fluid is not uniform and stagnant zones are present, the polarization of concentration is increased and the separation efficiency of the apparatus is reduced. In ordinary separation apparatuses, because of the presence of stagnant zones, no sufficient washing effect is attained, and in fresh water-preparing apparatuses, the purity of refined water is reduced. Moreover, in an apparatus for concentrating fruit juices or wheys by ultrafilitration, degeneration is caused by impurities incorporated and staying in the apparatus, and the quality of the product is degraded. Moreover, such disadvantage is not completely eliminated by flashing regeneration, and every time the regeneration is conducted, the efficiency is reduced and the life of the separation apparatus is shortened. In contrast, in the separation apparatus of the present invention where the flow condition of the fluid is improved by the above-mentioned specific arrangement, the foregoing common problems included in conventional fluid separation apparatuses can be substantially solved. Moreover, according to the present invention, a fluid separation apparatus having a highly improved separation efficiency and a structure that can easily be manufactured can be provided even by using permselective hollow fibers that are hardly practically used because of the non-swelling characteristic to solvent or low separation efficiency, or extremely high flow resistance though they have various advantageous properties, such as hollow fibers of hydrophobic synthetic or semi-synthetic polymers. Of course, the present invention can be applied to a separation apparatus including swelling hollow fibers, such as regenerated cellulose hollow fibers.

The fluid separation apparatus of the present invention is especially effective as an artificial kidney.

The present invention will now be described in detail by reference to the following Examples that by no means limit the scope of the invention.

EXAMPLE 1

A 75-denier 36-filament polyester textured yarn (modified stretch yarn of polyester "Breria" manufactured by Toray Industries, Inc.) was helically wound on a hollow fiber of polymethyl methacrylate, that is a hydrophobic material, having an outer diameter of 340 microns and an inner diameter of 240 microns, at a winding number of 1 per 10 mm of the hollow fiber in two layers in both the directions S and Z as shown in FIG. 2 to form a hollow fiber element having a length of 30 cm. Then, 8000 of so formed hollow fiber elements were gathered to form a hollow fiber element bundle. The bundle was inserted into the cylindrical casing. Both the ends of the bundle were potted with a polyurethane potting material to form tube sheets and the bundle was fixed to an apparatus having a structure as shown in FIG. 1. The packing ratio of the hollow fibers was adjusted to about 45%. The pull-out force of the hollow fiber element bundle was 1.7 Kg.

For comparison, a separation apparatus was prepared in the same manner as described above except that the spacer yarn was not wound around each hollow fiber. The packing ratio of the hollow fibers was adjusted to 45%, 80% or 85%.

The method for measuring the boundary layer resistance of a dialyzate solution at a dialysis test is known as a method for determining the separation efficiency of a separation apparatus relatively easily at a relatively high precision. In this and subsequent Examples, this method was adopted for determination of the separation efficiency.

More specifically, 0.7% salt solution was caused to flow internally of the hollow fibers at a constant rate (200 ml/min) and pure water was caused to flow externally of the hollow fibers at a constant rate (500 ml/min), and the inlet and outlet concentrations were measured based on the electric conductivity and the overall masstransfer resistance Ro was calculated. Separately, the flow rate of pure water flowing externally of the hollow fibers was increased so that the value of the resistance Ro became substantially constant, and the difference between the so obtained value of the resistance Ro and the value of the resistance Ro measured under the above standard conditions was defined as the boundary layer resistance Rd of the dialyzate solution. Simultaneously, the difference $\Delta Pd$ between the inlet pressure and outlet pressure of the liquid flowing externally of the hollow fibers under the standard conditions was measured.

In the above-mentioned apparatus according to the present invention, the pressure difference $\Delta Pd$ was about 10 mmHg, and the boundary layer resistance Rd of the dialyzate solution was about 6–10 min/cm. In contrast, in the comparative apparatus having a hollow fiber packing ratio of 45%, the pressure difference $\Delta Pd$ was 10 to 20 mmHg and the resistance Rd was about 20–40 min/cm. Therefore, it was confirmed that the separation efficiency of the comparative apparatus was much lower than that of the apparatus of the present invention. Incidentally, the sum of the membrane resistance and the boundary layer resistance of the liquid flowing internally of the hollow fibers was 28 to 30 min/cm. In the comparative apparatus having a packing ratio of 80%, the pressure difference $\Delta Pd$ was 30 to 115 mmHg and the resistance Rd was 7 to 15 min/cm. In the comparative apparatus having a packing ratio of 85%, the pressure difference $\Delta Pd$ was 120 to 230 mmHg and the resistance Rd was 3 to 6 min/cm.

From the foregoing results, it is seen that in the conventional apparatus, in order to obtain a high separation efficiency stably, it is necessary to adopt very unstable conditions where the pressure difference $\Delta Pd$ is extremely large, and in order to diminish the pressure difference $\Delta Pd$ stably, it is necessary to sacrifice the separation efficiency drastically. In contrast, in the apparatus according to the present invention, the separation efficiency is very high and the pressure difference $\Delta Pd$ is very small, and the separation operation can be performed very stably.

When leakages of the liquid at the tube sheet portions were examined in each of the foregoing apparatuses, it was found that no substantial leakage was caused in the tube sheet portions of the apparatus of the present invention, but in the comparative apparatuses, leakages of the liquid were so extreme that the yield was about 60% at highest.

EXAMPLE 2

A 150-denier 48-filament polyester textured yarn (stuffer box textured yarn) was wound on a hollow fiber of cellulose acetate, that is a material having a relatively highly hydrophobic characteristic, having an outer diameter or 270 microns and an inner diameter of 200 microns at a winding number of 4 per 10 mm of the hollow fiber in one layer in the direction Z as shown in FIG. 3 to form a hollow fiber element having a length of 30 cm. Then, 9500 of so formed hollow fiber elements were gathered to form a hollow fiber element bundle. In the same manner as described in Example 1, this bundle was assembled in an apparatus having a structure as shown in FIG. 1. The pull-out force of the packed bundle was 1.7 Kg.

For comparison, a separation apparatus was prepared in the same manner as described above except that the spacer yarn was not wound around the fiber, while adjusting the packing ratio to about 45%.

Leakages of the fluid from the tube sheet portions were not observed in any of 6 units prepared according to the present invention, but leakages were observed on one tube sheet portion in 2 units among 6 units prepared according to the comparative technique.

When the separation efficiency was determined according to the dialysis test method described in Example 1, it was found that the boundary layer resistance Rd was 9.5, 34, 27 or 18 min/cm in the units prepared according to the comparative technique but in each of the units prepared according to the present invention, the boundary layer resistance Rd was in the range of 9 to 12 min/cm. Accordingly, it was confirmed that a high separation efficiency can be attained stably according to the present invention. Incidentally, in this Example, the membrane resistance of the hollow fibers was about 20 min/cm.

EXAMPLE 3

A 300-denier 60-filament polyester textured yarn ("Breria") was spirally wound around a pair of two polymethyl methacrylate hollow fibers same as used in Example 1 at a winding number of 0.5 per 10 mm of the hollow fiber to form a hollow fiber element including two hollow fibers as shown in FIG. 4. Then, 4000 of so formed hollow fiber elements were gathered to form a hollow fiber element bundle having a length of 30 cm, and in the same manner as described in Example 1, a separation apparatus was prepared by using the so formed bundle. The pull-out force of the packed bundle was 0.9 Kg. The boundary layer resistance was in the range of $7\pm2$ min/cm and the pressure difference $\Delta Pd$ was in the range of $11\pm1$ mmHg. In this Example, 6 units were prepared, and leakages of the liquid from the tube sheet portions was not observed in any of these units.

For comparison, a separation apparatus was prepared in the same manner as described above except that three hollow fibers were combined in one set and the same spacer yarn was helically wound around such set of the three hollow fibers. In this comparative apparatus, a separation efficiency much higher than the separation efficiency of the apparatus assembled without using any spacer yarn could be attained stably, but leakages of the liquid from the tube sheet portions were frequently caused and it was confirmed that the adaptability to the potting operation for formation of tube sheets was inferior.

What we claim is:

1. A fluid separation apparatus comprising a bundle of a plurality of hollow fiber elements, each of which consists of one or two permselective hollow fibers, the fibers having an outer diameter of 50 to 600 microns and a spacer yarn composed of a textured yarn, which is spirally wound around said one or two hollow fibers wherein the apparent thickness of the spacer yarn is 0.5 to 3 times the outer diameter of the hollow fiber, and the number of windings of spacer yarn around each hollow fiber element is 0.5 to 20 per 10 mm of the length of the hollow fiber element, said fiber element bundle being contained in the interior of a casing at a hollow fiber packing ratio of 30 to 78%.

2. A fluid separation apparatus according to claim 1 wherein the outer diameter of the hollow fiber is 200 to 400 microns.

3. A fluid separation apparatus according to claim 1 wherein the denier of the textured yarn is 50 to 300D.

4. A fluid separation apparatus according to claim 1 wherein the denier of the textured yarn is 75 to 150D.

5. A fluid separation apparatus according to claim 1 wherein the textured yarn is at least one member selected from the group consisting of modified stretch yarns and bulk yarns.

6. A fluid separation apparatus according to claim 1 wherein the textured yarn is at least one member selected from the group consisting of modified false-twisted textured yarns, stuffer box textured yarns, air-jet textured yarns, knit-deknit textured yarns and gear crimp textured yarns.

7. A fluid separation apparatus according to claim 1 wherein the hollow fiber is a permselective one composed of a hydrophobic polymeric substance.

8. A fluid separation apparatus according to claim 7 wherein the hydrophobic polymeric substance is polymethyl methacrylate.

9. A fluid separation apparatus according to claim 1 wherein the number of windings of the spacer yarn around the hollow fiber is 0.2 to 4.0 per 10 mm of the hollow fiber.

10. A fluid separation apparatus according to claim 1 wherein the spacer yarn is composed of a polyester.

11. A fluid separation apparatus according to claim 1 wherein the number of the hollow fibers constituting the hollow fiber element bundle is at least 2000.

12. A fluid separation apparatus according to claim 1 wherein the number of the hollow fibers constituting the hollow fiber element bundle is at least 6000.

13. A fluid separation apparatus according to claim 1 wherein the degree of pressing the inside of the casing wall by the hollow fiber element bundle is such that the force required for pulling out the hollow fiber element bundle from the casing is 0.2 to 3.0 Kg.

14. A fluid separation apparatus according to claim 1, wherein said casing includes a casing wall, a fluid inlet and a fluid outlet on the side portion thereof, and said apparatus further comprises tube sheets for supporting and fixing both the end portions of the bundle at the end portions of the casing, and headers located outside said tube sheets to define chambers between the headers and the tube sheets, respectively, the headers having fluid inlet and outlet opened to said chambers and to the outside of the casing, a liquid-tight relation being established between said hollow fiber bundle and said tube sheets, and the open ends of the respective hollow fibers being communicated with said chambers, and the hollow fiber element bundle is contained in said casing in such a state that the inside of said casing wall is pressed by said bundle.

15. A fluid separation apparatus according to claim 1, wherein the diameter of the hollow fiber element bundle is such that the area of a cross-section of said bundle taken perpendicular to the fiber axis is 1.04 to 1.44 times the cross-section area of the said casing taken perpendicular to the longitudinal axis of said casing, the hollow fibers being arranged so that only two of the hollow fibers can adhere to each other in pairs in the direction of the fiber axis in the proximity of the ends of the hollow fibers.

16. A fluid separation apparatus according to claim 1, wherein the denier of the textured yarn is 50 to 300D, said textured yarn consisting of monofilaments having a denier of 1 to 15d.

17. A fluid separation apparatus according to claim 16 wherein the denier of the textured yarn is 75 to 150D.

18. A fluid separation apparatus comprising a bundle of a plurality of hollow fiber elements, each of which consists of one or two permselective hollow fibers, the fibers having one diameter of 10 to 600 microns and a spacer yarn composed of a textured yarn, which is spirally wound around said one or two hollow fibers wherein the denier of the spacer yarn is 50 to 300D and the apparent thickness of the spacer yarn is 0.5 to 3 times, the outer diameter of the hollow fiber, and the number of windings of spacer yarn around each hollow fiber element is 0.05 to 20 per 10 mm of length of the hollow fiber element, said hollow fibers being arranged so that only two of the hollow fibers can adhere to each other in pairs in the direction of the fiber axis in the proximity of the ends of the hollow fibers, said fiber element bundle being contained in the interior of a casing at a hollow fiber packing ratio of 30 to 78% in such a state that the bundle of the hollow fiber element presses inside of the casing wall and the force required for pulling the hollow fiber element bundle from the casing is 0.2 to 3.0 Kg.

* * * * *